US 12,408,655 B2

(12) United States Patent
Rakshit et al.

(10) Patent No.: US 12,408,655 B2
(45) Date of Patent: Sep. 9, 2025

(54) AUTOMATED BIRD DETECTION AND TARGETED ACTIVATION OF ULTRASONIC BIRD REPELLER FOR WIND TURBINES

(71) Applicant: INTERNATIONAL BUSINESS MACHINES CORPORATION, Armonk, NY (US)

(72) Inventors: Sarbajit K. Rakshit, Kolkata (IN); Jagabondhu Hazra, HBR Layout 5 (IN); Manikandan Padmanaban, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 18/328,802

(22) Filed: Jun. 5, 2023

(65) Prior Publication Data

US 2024/0397933 A1 Dec. 5, 2024

(51) Int. Cl.
*A01M 29/18* (2011.01)
*G05B 13/02* (2006.01)

(52) U.S. Cl.
CPC ......... *A01M 29/18* (2013.01); *G05B 13/0265* (2013.01)

(58) Field of Classification Search
CPC ...... A01M 29/18; A01M 29/10; A01M 29/16; A01M 31/002; G05B 13/0265
See application file for complete search history.

(56) References Cited

U.S. PATENT DOCUMENTS

| | | | |
|---|---|---|---|
| 8,742,977 | B1 | 6/2014 | Piesinger |
| 2013/0050400 | A1 | 2/2013 | Stiesdal |
| 2017/0000106 | A1 | 1/2017 | Duncan |
| 2017/0127664 | A1 | 5/2017 | Hein |
| 2019/0021303 | A1 | 1/2019 | Swaddle |

(Continued)

FOREIGN PATENT DOCUMENTS

| | | |
|---|---|---|
| CN | 202857650 U | 4/2013 |
| CN | 113767894 A * | 12/2021 |
| WO | 2011118937 A2 | 9/2011 |

OTHER PUBLICATIONS

Translation of CN-113767894-A (Year: 2021).*

(Continued)

*Primary Examiner* — Daniel Pihulic
(74) *Attorney, Agent, or Firm* — Teddi Maranzano

(57) ABSTRACT

Systems and methods are provided for detecting and repelling bird species approaching a wind farm, using targeted ultrasonic/sonic frequencies. A zone of vulnerability boundary is set around the wind farm at which bird repellers start responding to instructions to broadcast ultrasonic/sonic. Based on the received plurality of images, at least one bird species is identified as approaching the zone of vulnerability boundary. The bird repellers receive instructions to broadcast beginning with the calculated starting ultrasonic/sonic frequency, and incrementally increasing or decreasing the starting ultrasonic/sonic frequency in response to the at least one identified bird species continuing to approach or to move away from the zone of vulnerability boundary. A learning model is updated with statistics, which the identified plurality of bird species and the ultrasonic/sonic frequency receiving the optimal response from the identified plurality of bird species.

20 Claims, 3 Drawing Sheets

(56) References Cited

U.S. PATENT DOCUMENTS

2020/0201332 A1 6/2020 Pedersen
2024/0397933 A1* 12/2024 Rakshit ................ A01M 29/10

OTHER PUBLICATIONS

Mount, "Wind farms kill millions of birds each year. Scientists may have found a simple solution: paint turbines black," Fortune [article], Nov. 22, 2022 [accessed on May 6, 2023], 12 pages, Retrieved from the Internet: <URL: https://fortune.com/2022/11/22/wind-farms-bird-deaths-blades-turbines-paint-black/>.

Author Unknown, "Thermal Imaging: Nocturnal Bird Surveys," BSG ecology [online], [accessed on Apr. 12, 2023], 3 pages, Retrieved from the Internet: <URL: https://bsg-ecology.com/portfolio_page/thermal-imaging-nocturnal-bird-surveys/>.

Ferris, "Weekly data: How many birds are really killed by wind turbines?" Energy Monitor [article], Jan. 31, 2022 [accessed on Apr. 12, 2023], 8 pages, Retrieved from the Internet: <URL: https://www.energymonitor.ai/tech/renewables/weekly-data-how-many-birds-are-really-killed-by-wind-turbines/>.

Merriman, "How Many Birds Are Killed by Wind Turbines?" American Bird Conservancy [blog], Jan. 26, 2021 [accessed on Apr. 12, 2023], 9 pages, Retrieved from the Internet: <URL: https://abcbirds.org/blog21/wind-turbine-mortality/>.

Mount, "Wind farms kill millions of birds each year. Scientists may have found a simple solution: paint turbines black," Fortune [article], Nov. 22, 2022 [accessed on Apr. 12, 2023], 12 pages, Retrieved from the Internet: <URL: https://fortune.com/2022/11/22/wind-farms-bird-deaths-blades-turbines-paint-black/>.

Ultrasonic Bird Repellers Keep Birds Away Quietly, Datasheet [online], Bird-X, 2023 [accessed on Apr. 12, 2023], 5 pages, Retrieved from the Internet: <URL: https://bird-x.com/bird-products/electronic/ultrasonic-2/>.

Voigt, et al., "Limitations of acoustic monitoring at wind turbines to evaluate fatality risk of bats," Mammal Review [article], 2021 [accessed on Mar. 16, 2023], pp. 559-570, vol. 51, Issue 4, ISSN: 0305-1838, Retrieved from the Internet: <URL: https://onlinelibrary.wiley.com/doi/full/10.1111/mam.12248>.

* cited by examiner

AUTOMATED BIRD DETECTION AND TARGETED ACTIVATION OF ULTRASONIC BIRD REPELLER FOR WIND TURBINES

BACKGROUND

This invention relates generally to computer systems, and more particularly to wind turbine technology.

Wind is a popular source of clean energy. However, the technology is challenged to provide that energy while also safeguarding the birds and bats that are accidentally harmed by the rotating wind turbine blades.

Although several solutions exist to address this problem, they are mainly directed to altering the appearance of the wind turbine blades in an attempt to ward off the birds and bats. It would be advantageous to provide a system for identifying the species of birds and bats, and dynamically set the optimal value of frequency based on the deterrent response of the birds and bats to change the path of flight away from the turbine location without causing any damage to their hearing receptors.

SUMMARY

A method is provided for detecting and repelling bird species approaching a wind farm, using targeted ultrasonic/sonic frequencies. A zone of vulnerability boundary is set around the wind farm at which bird repellers start responding to instructions to broadcast ultrasonic/sonic. Based on the received plurality of images, at least one bird species is identified as approaching the zone of vulnerability boundary. The bird repellers receive instructions to broadcast beginning with the calculated starting ultrasonic/sonic frequency, and incrementally increasing or decreasing the starting ultrasonic/sonic frequency in response to the at least one identified bird species continuing to approach or to move away from the zone of vulnerability boundary. A learning model is updated with statistics, which the identified plurality of bird species and the ultrasonic/sonic frequency receiving the optimal response from the identified plurality of bird species.

Embodiments are further directed to computer systems and computer program products having substantially the same features as the above-described computer-implemented method.

DETAILED DESCRIPTION OF THE INVENTION

Figure 1:
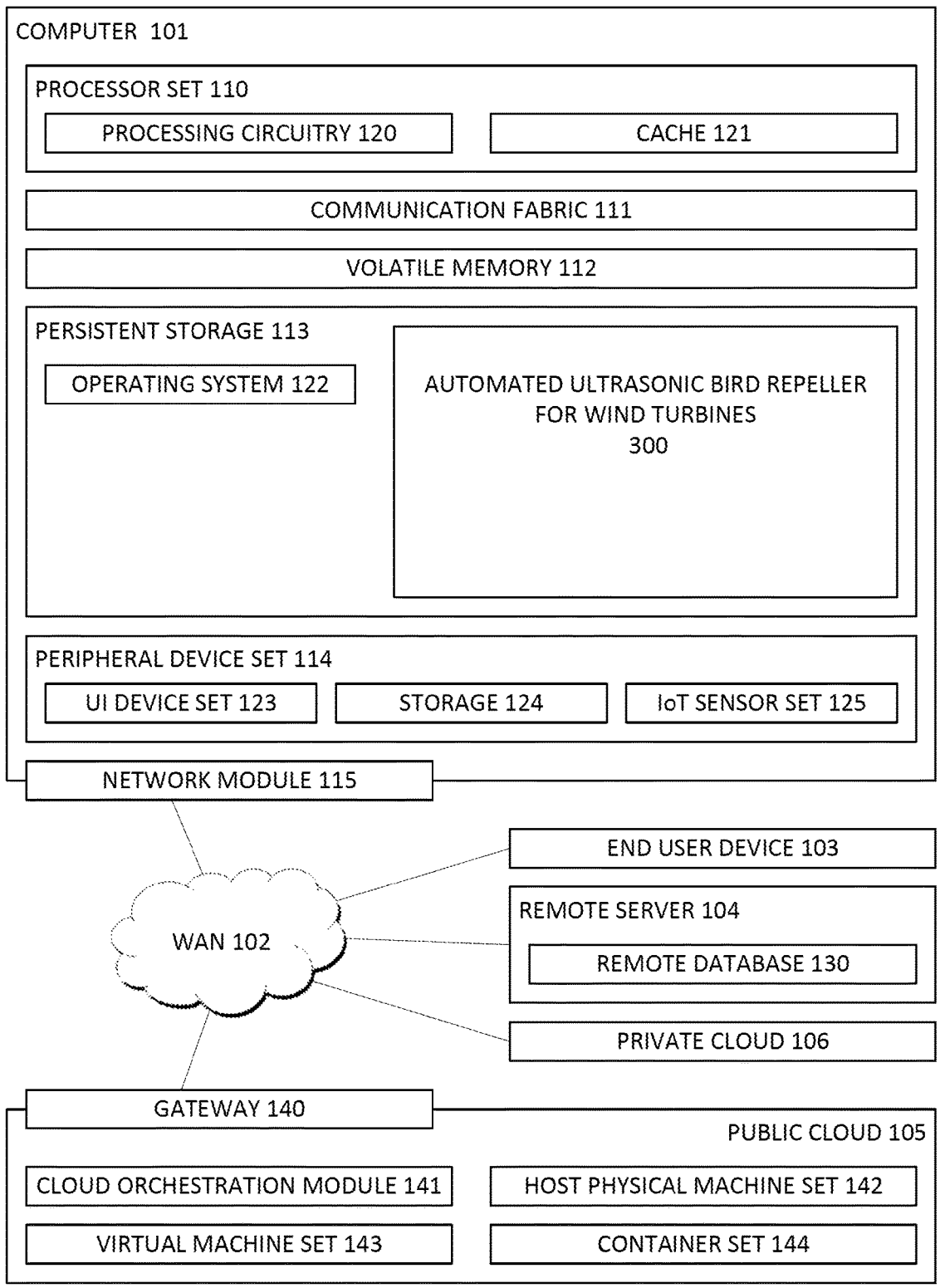
FIG. 1 illustrates the operating environment of a computer server embodying a system for automated ultrasonic bird repeller for wind turbines.

Wind has become a popular source of clean energy. However, the technology is challenged to provide that energy while also safeguarding the birds and bats (hereinafter "birds") that are accidentally harmed, even lost, by the rotating turbine blades.

An analysis of bat fatalities around wind turbines indicates that the decompression caused by rapid air pressure reduction near the turbine blades can be tied to barotrauma. While bats can use their echolocation ability to identify the wind turbines in their path, they cannot identify the abrupt air pressure change. Barotrauma is more often fatal in bats than in birds due to the differences in mammal physiology as compared to the physiology of birds.

However, for birds, the major issue leading to collisions is that poorly sited wind farms interfere with their migratory patterns. The collisions between birds and wind turbines tend to increase when the wind turbines are placed in the path of migratory routes, especially when the wind turbine blades reach up into the average flight zone of birds that migrate at night.

Existing solutions attempt to solve the problem of bird loss by using visual deterrents to ward off the birds, for example by painting the turbine blades in colors, e.g., black, and white, or by placing bright lights on the tops of the wind turbines. However, these solutions do not adequately address the pressure drop trauma caused to bats, or the collisions that occur during night-time bird migrations.

Another approach involves deploying radar or cameras to detect approaching birds, and in response, stopping the operation of one or more of the wind turbines in the wind farm. This may have a positive effect on both bats and evening bird migrations if the detection can occur without regard to inclement weather conditions, and if the elapsed time between the camera/radar detection and the stopping of the wind turbine is short enough to affect a difference.

Yet another approach is to mount a device on one or more of the wind turbines to broadcast pre-recorded distress sounds, or a static sonic or ultrasonic noise (10 kHz-20 kHz). Similar to humans, birds suffer damage to auditory receptors from loud noises. The sound intensity that produces damages and the amount of damage produced differs depending on the bird species. As an example, birds residing in, and around active airports might be constantly subjected to damaging sound pressure levels (i.e., decibels). Thus, to effectively disperse birds using sound, auditory alerts must be at frequencies that can be detected by the possibly already damaged auditory receptors. Although some if not all species of birds have the ability to repair damaged hair cells, continued indiscriminate exposure to loud noises likely would prevent hearing recovery.

Embodiments of the present invention address shortcomings of the purely visual approaches by being operable at night, and by removing the dependencies on visual cues. Such embodiments address the shortcomings of approaches that use sound by dynamically setting the optimal frequency value based on the identified species and deterrent response of the oncoming birds. Additionally, this approach would likely increase the bats' ability to avoid the wind turbines in advance of encountering the barometric pressure drop.

Beginning now with FIG. 1, an illustration is presented of the operating environment of a networked computer, according to an embodiment of the present invention.

Computing environment 100 contains an example of an environment for the execution of at least some of the computer code involved in performing the inventive methods, such as embodying a system for automated ultrasonic bird repeller for wind turbines 300 (system). In addition to block 300, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 300, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 300 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 300 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, an administrator that operates computer 101), and may take any of the forms discussed above in connection with computer 101. For example, EUD 103 can be the external application by which an end user connects to the control node through WAN 102. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
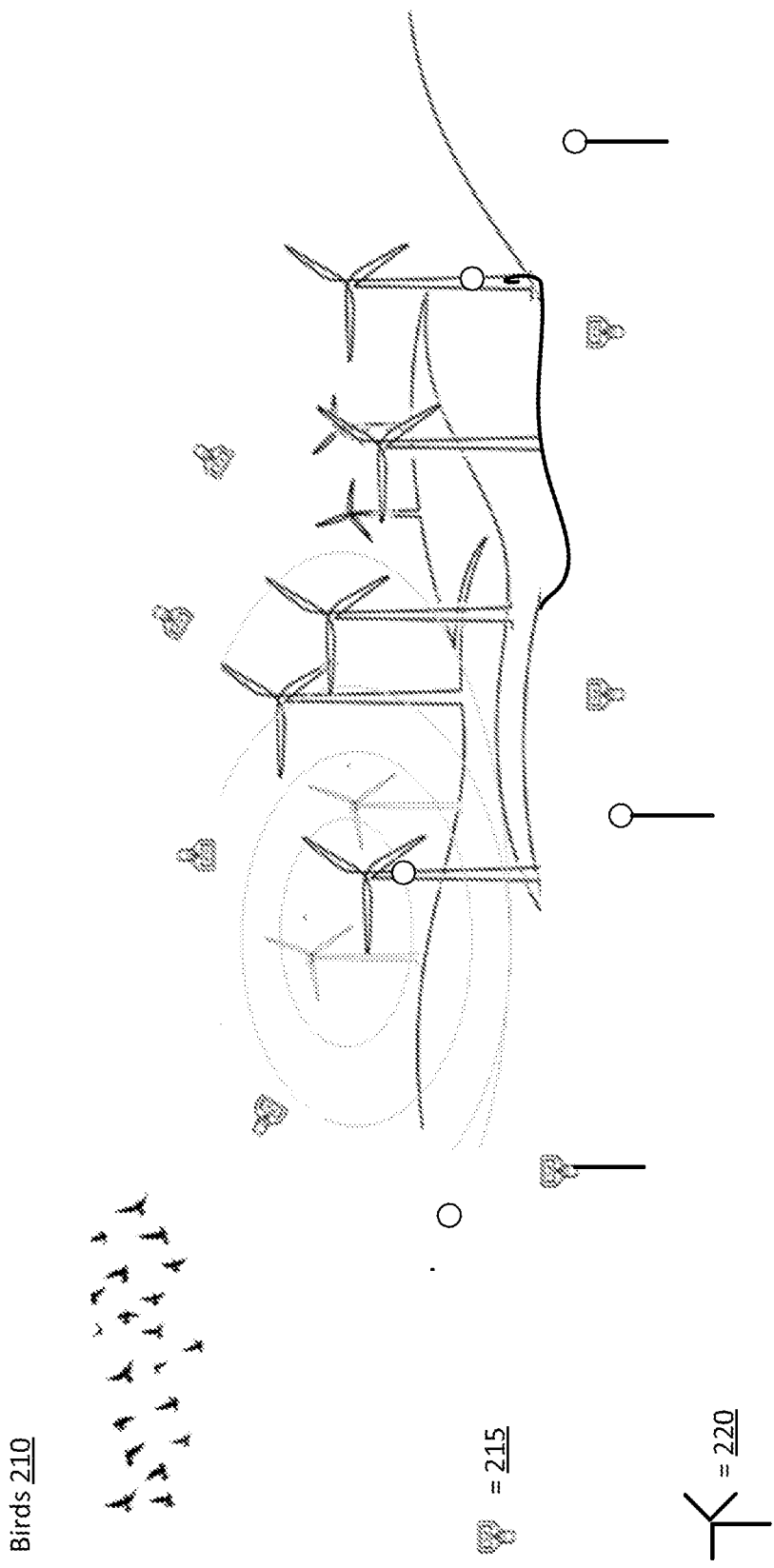
FIG. 2 illustrates an example of a wind farm environment where embodiments of the present invention can be practiced.

FIG. 2 depicts an example of a wind farm environment where embodiments of the present invention can be practiced.

In FIG. 2, the wind farm includes several wind turbines 220. A flock of birds 210 is depicted flying in the vicinity of the wind farm. The birds may include one or more than one species, and there may be multiple bat species, as well.

A plurality of thermal cameras 215 is deployed around the periphery of the wind farm to proactively detect the number, species, and speed of approaching birds 210, and the direction of their approach. Thermal imaging cameras are designed to detect infrared radiation, i.e., heat, that objects within a defined field of view emit. The metabolic heat that the birds produce becomes visible as a distinct thermal image against the cooler background. The thermal cameras 215 may be positioned in a variety of ways, depending on the topology where the wind farm is sited, the characteristic population of bird species likely to encounter the wind farm, and seasonal migratory patterns, among other factors. The thermal cameras 215 may be placed around the perimeter of the wind farm, or within the perimeter but at a distance prior to the pre-defined vulnerable zone. The pre-defined vulnerable zone is the point at which the thermal cameras 215 are triggered to begin thermal image capture, and the point which triggers the system 300 to execute a heightened response to the approaching birds 210. It is a configurable input parameter to the system 300 (345 of FIG. 3), which allows for maximum flexibility in configuring the system 300 for a variety of topologies and bird species. Based on an analysis of these factors, the thermal cameras 215 may be positioned at ground level, on support structures that are separate from the wind turbines, may be attached to the wind turbines, or may be a combination of both. Similarly, these factors may be considered when determining the angle of camera aim relative to the horizon of one or more of the thermal camera 215. However, all the thermal cameras 215 may be focused to the same distance from the wind turbines, or to a combination of focal points. This provides increased flexibility in the types of applications and locations in which embodiments of the present invention can be used, including those that are water-based (e.g., sea, river, and lake). In addition to the thermal cameras 215, the wind farm includes a series of sensors deployed around the boundary and/or pre-defined vulnerable zone to detect the direction and speed of approaching birds 210.

One or more ultrasonic bird repellers 225 are placed around the wind farm. The bird repellers 225 may be positioned in a variety of ways, depending on the topology where the wind farm is sited, the characteristic population of bird species likely to encounter the wind farm, and seasonal migratory patterns, among other factors.

The bird repellers 225 respond to program instructions to dynamically set the optimal frequency and intensity based on the bird species and the deterrent response of the birds to change the path of flight away from the turbine location. The frequency that the bird repellers 225 emit is calculated according to the bird species, the distance at which they were detected from the wind farm, and the response of the bird species to the deterrence but is designed to not damage their hearing receptors. A reinforcement learning based methodology dynamically initially sets estimated values for frequency and intensity using an available knowledge base comprising data relevant to a variety of bird species. The reward is dynamically calculated based on the deterrence detected as rate of change of flight path of the bird species, as is the penalty for entering the pre-defined vulnerable zone. In FIG. 2, bird repellers 225 are shown positioned on the wind turbine supports, at ground level, and on supports.

Figure 3:
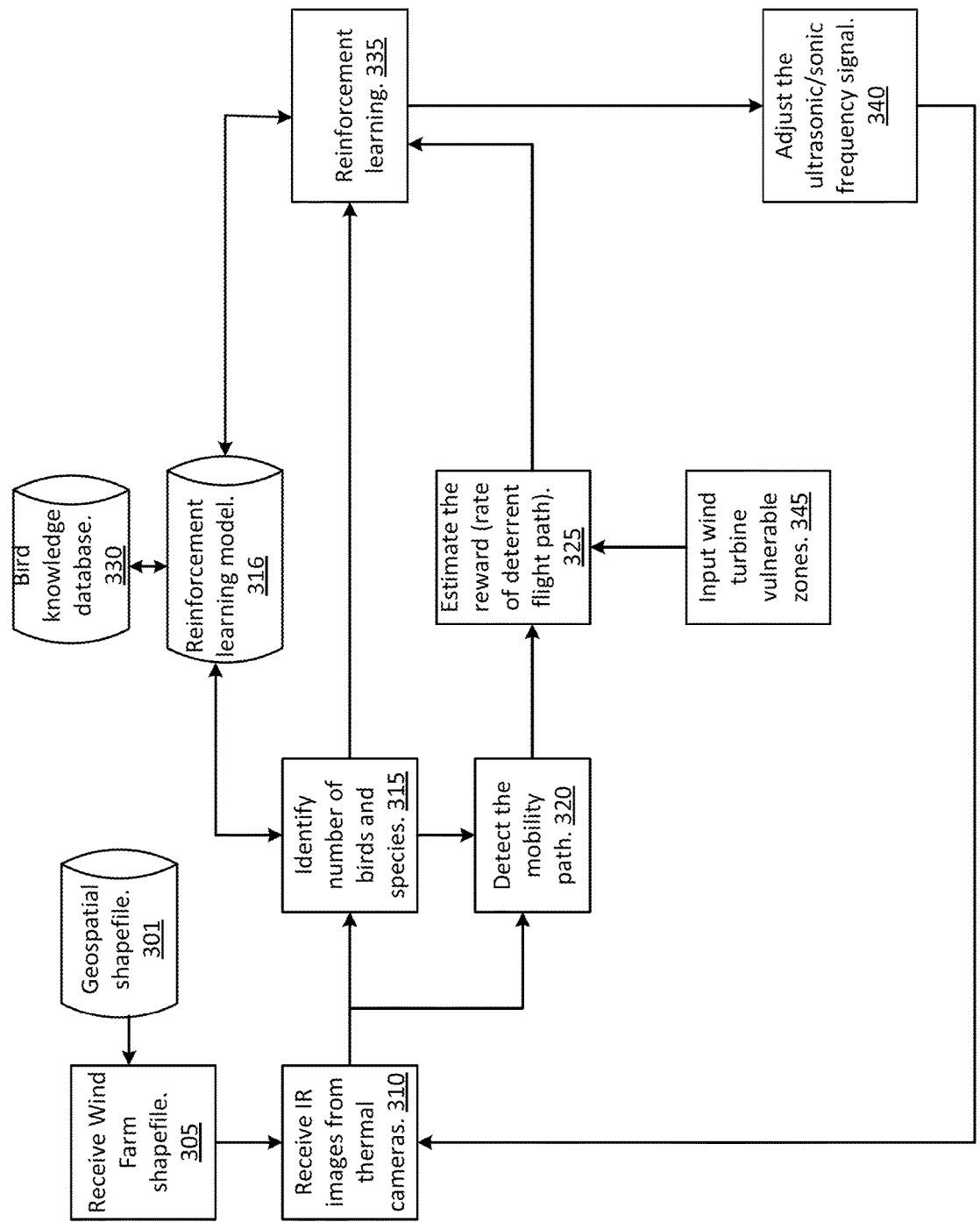
FIG. 3 is a flow chart block diagram of an automated ultrasonic bird repeller system for wind turbines farm in accordance with the present disclosure.

FIG. 3 illustrates the interaction of the wind turbines 220, thermal cameras 215, and bird repellers 225 with the birds 210 in a system to detect and repel bird species approaching a wind farm.

The system 300 receives as input a geospatial data shapefile 301, 305 that contains datapoints describing the geographical features of a given location, such as topology, hydrology, and elevation, for example. The wind farm perimeter can be determined and defined from the geospatial data shapefile 301. The system 300 also receives as input at least one bird knowledge database 330 comprising bird species characteristics for visual identification, using APIs from such software as IBM Watson® Visual Recognition (IBM Watson is a registered trademark of IBM in the United States). Bird sensitivity to frequency intensity data, by species, may be a separate database or may be included in the bird knowledge database 330. Bird sensitivity data includes at least the species name, a lower sensitivity limit, an upper sensitivity limit, and a value at which the species is most sensitive to sonic/ultrasonic sound. The system 300 uses this highest sensitivity value to avoid broadcasting beyond that point, thereby avoiding damaging hearing receptors. The measurements may be specified in units of hertz (Hz).

The system 300 receives IR images from the thermal cameras 215 (310). The thermal cameras 215 can be set to begin image capture based on detecting birds 210 approaching at the pre-defined vulnerable zone boundary, but the starting point for image capture is configurable. Using image analysis, the bird species, or predominant bird species, in the is identified in the bird knowledge database 330 to a percent confidence of accuracy. If more than one species is identified, the system 300 may determine a response based on the majority approaching species. For example, the system 300 may instruct the bird repellers 225 to begin broadcasting using the frequency of the most sensitive bird species even if that bird species is a minority in the approaching flock.

Having identified the bird species, number of birds, and flight trajectory (direction and speed of approach) (315, 320), the system 300 searches the bird knowledge base 330 and reinforcement learning model 316 for an estimated initial frequency to instruct the bird repellers 225 to broadcast (325). Based on the response of the approaching birds, the system 300 learns an optimal policy that maximizes the reward function, and updates the reinforcement learning model 316 with the results, including which species responds the soonest with which frequency. This historic data is used to update the model and increase the percent confidence of accuracy for the next iteration of reinforcement learning (335). The system 300 waits a configurable amount of time, typically on the order of seconds, to detect a change in the trajectory of the approaching birds. Based on the detected response, the bird repellers 225 are dynamically instructed to incrementally increase or decrease the broadcast frequency (340), typically in increments of seconds. Both the amount of time to wait to detect a change in the trajectory of the approaching birds, and the increment amounts can be pre-defined in the system 300 configuration, or can be adjusted based on the speed of the birds' flight, distance between the birds and the pre-defined zone of vulnerability, and the type of bird species.

The reinforcement learning based methodology dynamically sets the optimal value of frequency intensity. The initial broadcast intensity is estimated from the available knowledge based on the identified species. The rewards (decreased intensity) are dynamically calculated based on detecting that the flight path of the birds is slowing or moving away from the vulnerable zone. The penalty for not changing the flight path is to gradually increase frequency up to the limit of the highest sensitivity. If multiple species are identified, the limit is the upper sensitivity limit of the most sensitive species. In this way, the positive behavior is encouraged and the less positive behavior is discouraged so that the birds can be moved away from the pre-defined vulnerable zone of the wind farm without damaging their hearing receptors.

A penalty is calculated for a higher rate of change toward, or for entering, the pre-defined vulnerable zone. A positive reward is calculated for not entering the pre-defined vulnerable zone, for a slower change of flight path toward the pre-defined vulnerable zone, or for moving away from the pre-defined vulnerable zone. The slower rates of change are designed to avoid sudden shock, thereby preventing hearing receptors damage.

The initial estimate is based on the results of the system 300 searching the bird knowledge base (330) and the reinforcement learning model (316) for the estimated initial frequency.

An example determination of optimally setting the frequency intensity, based on the rate of change of deterrent flight path is as follows:

$$Q^{new}(s_t, a_t) \leftarrow Q(s_t, a_t) + \alpha \cdot (r_t + y \cdot \max(Q(s_{t+1}, a_t)) - Q(s_t, a_t)$$

where: $(r_t + y \cdot \max Q(s_{t+1}, a) - Q(s_t, a_t)$ is the temporal difference $(r_t + y \cdot \max Q(s_{t+1}, a)$ is the new value (temporal difference target)

$Q(s_t, a_t)$ is the current value a is the learning rate $r_t$ is the reward received from moving from state St to state $s_{t+1}$, and is calculated based on the rate of change of the flight path trajectory y is the discount factor, between '0' and '1' ('0'<='y'<='1') and has the effect of valuing rewards received earlier higher than those received later, reflecting the value of a good starting value max $Q(s_{t+1}, a)$ is the estimate of optimal future value $s_t$, $a_t$ are state t and $Q(s_t, a_t)$ is the current quality of state and action combined max $(Q(s_{t+1}, a_t))$ is the maximum reward that can be obtained from state $s_{t+1}$ As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules, and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information. A computer readable memory/storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:
receiving a plurality of thermal images from a plurality of thermal imaging cameras, wherein the thermal imaging cameras detect metabolic heat, speed, and direction of approaching birds, and wherein the thermal imaging cameras are placed around and within a perimeter of a wind farm;

based on a geospatial data shapefile describing a topology of the wind farm, setting a configurable zone of vulnerability boundary at which the thermal imaging cameras begin a thermal image capture, and at which bird repellers start responding to instructions to broadcast ultrasonic/sonic;

based on the received plurality of thermal images, identifying by visual recognition at least one bird species approaching the zone of vulnerability boundary;

based on sound sensitivity data corresponding to the identified at least one bird species, instructing the bird repellers to broadcast an ultrasonic/sonic frequency beginning with an optimal frequency value and dynamically and incrementally increasing the ultrasonic/sonic frequency up to a maximum sensitivity limit in response to the at least one identified bird species continuing to approach the zone of vulnerability, or decreasing the ultrasonic/sonic frequency in response to the at least one identified bird species moving away from the zone of vulnerability boundary; and updating a reinforcement learning model with statistics, the statistics being the identified plurality of bird species and the ultrasonic/sonic frequency receiving the optimal response from the identified plurality of bird species.

2. The method of claim 1, wherein the zone of vulnerability boundary is set at any distance from a boundary of a wind farm.

3. The method of claim 1, wherein a plurality of datapoints in a geospatial shapefile identifies a boundary of a wind farm.

4. The method of claim 1, further comprising calculating a starting ultrasonic/sonic frequency based on the identified at least one bird species, and historical learning model input.

5. The method of claim 1, wherein the ultrasonic/sonic frequency is not incremented beyond an upper sensitivity limit of the bird species.

6. The method of claim 1, wherein based on there being more than one bird species, setting a maximum the ultrasonic/sonic frequency to an upper sensitivity limit of the bird species being most sensitive.

7. The method of claim 1, wherein identifying at least one bird species further comprises:
    comparing the received plurality of images to images in a bird knowledge database; and
    based on a percent confidence of accuracy, identifying at least one bird species in the bird knowledge database.

8. A computer program product, the computer program product comprising a non-transitory tangible storage device having program code embodied therewith, the program code executable by a processor of a computer to perform a method, the method comprising:
    receiving a plurality of thermal images from a plurality of thermal imaging cameras, wherein the thermal imaging cameras detect metabolic heat, speed, and direction of approaching birds, and wherein the thermal imaging cameras are placed around and within a perimeter of a wind farm;
    based on a geospatial data shapefile describing a topology of the wind farm, setting a configurable zone of vulnerability boundary at which the thermal imaging cameras begin thermal image capture, and at which bird repellers start responding to instructions to broadcast ultrasonic/sonic;
    based on the received plurality of thermal images, identifying by visual recognition at least one bird species approaching the zone of vulnerability boundary;
    based on sound sensitivity data corresponding to the identified at least one bird species, instructing the bird repellers to broadcast an ultrasonic/sonic frequency beginning with an optimal frequency value and dynamically and incrementally increasing the ultrasonic/sonic frequency up to a maximum sensitivity limit in response to the at least one identified bird species continuing to approach the zone of vulnerability, or decreasing the ultrasonic/sonic frequency in response to the at least one identified bird species moving away from the zone of vulnerability boundary; and
    updating a reinforcement learning model with statistics, the statistics being the identified plurality of bird species and the ultrasonic/sonic frequency receiving the optimal response from the identified plurality of bird species.

9. The computer program product of claim 8, wherein the zone of vulnerability boundary is set at any distance from a boundary of a wind farm.

10. The computer program product of claim 8, wherein a plurality of datapoints in a geospatial shapefile identifies a boundary of a wind farm.

11. The computer program product of claim 8, further comprising calculating a starting ultrasonic/sonic frequency based on the identified at least one bird species, and historical learning model input.

12. The computer program product of claim 8, wherein the ultrasonic/sonic frequency is not incremented beyond an upper sensitivity limit of the bird species.

13. The computer program product of claim 8, wherein based on there being more than one bird species, setting a maximum the ultrasonic/sonic frequency to an upper sensitivity limit of the bird species being most sensitive.

14. The computer program product of claim 8, wherein identifying at least one bird species further comprises:
    comparing the received plurality of images to images in a bird knowledge database; and
    based on a percent confidence of accuracy, identifying at least one bird species in the bird knowledge database.

15. A computer system, comprising:
    one or more processors;
    a memory coupled to at least one of the processors;
    a set of computer program instructions stored in the memory and executed by at least one of the processors in order to perform actions of:
    receiving a plurality of thermal images from a plurality of thermal imaging cameras, wherein the thermal imaging cameras detect metabolic heat, speed, and direction of approaching birds, and wherein the thermal imaging cameras are placed around and within a perimeter of a wind farm;
    based on a geospatial data shapefile describing a topology of the wind farm, setting a configurable zone of vulnerability boundary at which the thermal imaging cameras begin thermal image capture, and at which bird repellers start responding to instructions to broadcast ultrasonic/sonic;
    based on the received plurality of thermal images, identifying by visual recognition at least one bird species approaching the zone of vulnerability boundary;

based on sound sensitivity data corresponding to the identified at least one bird species, instructing the bird repellers to broadcast an ultrasonic/sonic frequency beginning with an optimal frequency value and dynamically and incrementally increasing the ultrasonic/sonic frequency up to a maximum sensitivity limit in response to the at least one identified bird species continuing to approach the zone of vulnerability, or decreasing the ultrasonic/sonic frequency in response to the at least one identified bird species moving away from the zone of vulnerability boundary; and updating a reinforcement learning model with statistics, the statistics being the identified plurality of bird species and the ultrasonic/sonic frequency receiving the optimal response from the identified plurality of bird species.

16. The computer system of claim 15, wherein the zone of vulnerability boundary is set at any distance from a boundary of a wind farm.

17. The computer system of claim 15, wherein a plurality of datapoints in a geospatial shapefile identifies a boundary of a wind farm.

18. The computer system of claim 15, further comprising calculating a starting ultrasonic/sonic frequency based on the identified at least one bird species, and historical learning model input.

19. The computer system of claim 17, wherein:
the ultrasonic/sonic frequency is not incremented beyond an upper sensitivity limit of the bird species; and
wherein based on there being more than one bird species, setting a maximum the ultrasonic/sonic frequency to the upper sensitivity limit of the bird species being most sensitive.

20. The computer system of claim 15, wherein identifying at least one bird species further comprises:
comparing the received plurality of images to images in a bird knowledge database; and
based on a percent confidence of accuracy, identifying at least one bird species in the bird knowledge database.

\* \* \* \* \*